INVENTORS: H. GHIRON
J. A. HARR
N. A. MARTELLOTTO
BY John C Albert
ATTORNEY

TELEPHONE SWITCHING SYSTEM CONTROL AND MEMORY APPARATUS ORGANIZATION

Filed Oct. 14, 1964 9 Sheets-Sheet 5

March 26, 1968 H. GHIRON ET AL 3,375,499

TELEPHONE SWITCHING SYSTEM CONTROL AND MEMORY APPARATUS ORGANIZATION

Filed Oct. 14, 1964 9 Sheets-Sheet 8

3,375,499

TELEPHONE SWITCHING SYSTEM CONTROL AND MEMORY APPARATUS ORGANIZATION

Hugo Ghiron, Colts Neck, John A. Harr, Fair Haven, and Nicholas A. Martellotto, Red Bank, N.J., assignors to Bell Telephone Laboratories, Incorporated, New York, N.Y., a corporation of New York Filed Oct. 14, 1964, Ser. No. 403,845
5 Claims. (Cl. 340—172.5)

ABSTRACT OF THE DISCLOSURE

A program controlled telephone switching system which employs a generic program is disclosed. The use of a generic program facilitates the production of programs for telephone offices of a defined class and facilitates the testing, installation and growth of such offices. The physical organization of the program and the system data in memory at fixed and variable memory locations is illustrated.

This invention relates in general to program controlled data handling systems and particularly to the organization of information in the memory of such systems.

The problems illustrated herein occur in many types of data handling systems; however, for purposes of illustration, these problems and the solutions thereto are discussed herein with respect to a program controlled telephone switching system as an illustrative data handling system.

A large number of telephone switching offices throughout the United States may be considered as members of a particular class of office in that a fixed range of service features will satisfy the requirements of these offices and the maximum size and traffic handling capacity of each of these offices will not exceed a particular limit. Although these many offices may be considered to be members of a class, each office has many distinguishing characteristics which make that office unique. Within a given class of office there are for example:

A. Many system features;
B. Many classes of subscribers;
C. Many types of trunks;
D. A wide range of traffic handling requirements.

Undoubtedly, no two offices would initially be identical in all of these items.

Further, during the life of an office there are demands for changes in traffic handling capacity, office features, numbers of lines and trunks, et cetera, and these changes likewise are unique to the individual office.

The program and the data for a program controlled telephone switching office are quite extensive and the organization of this information within the bulk memory system of such offices must lend itself to adaption to the unique characteristics of the individual offices of the class and to the unique growth of such offices.

In prior art data processing systems little attention is paid to the organization of programs and data in absolute memory locations. Programs are generally compiled and assembled so that instructions and data are liberally intermingled in the memory layout. If a new program in which the program and data are interspersed in the memory is generated for each new telephone installation and each time changes are to be effected in a particular office, there is a great possibility that errors will occur in compiling the program and in assigning absolute addresses within the memory. Further, where the entire office program and data must be recompiled to provide for changes in service or office growth, there is considerable cost involved. Even more important is the fact that it is virtually impossible to introduce the newly compiled programs and data into the system without interrupting service.

As often occurs, new and unusual service features are developed and older telephone switching offices must be updated to provide such features. Where the system programs and data are compiled on an office by office basis, the addition of a single feature to these offices is very costly and complicated since it involves the recompilation of the programs and data for each of the individual offices.

It is an object of our invention to organize the program and data information in a program controlled telephone switching system memory to permit more efficient and dependable initial installation and orderly growth of a telephone switching office.

In accordance with our invention a "generic program," which contains sufficient routines to perform all of the possible tasks common to a particular class of office, is employed for all offices of that class. The generic program is tailored to a specific office by means of office "parameters" which are stored in the memory apart from the generic program. The office parameters define both the features of the office and the hardware configurations such as the number of originating registers, the degree of equipping network frames, the concentration ratio used in network frames, et cetera. In addition, features attributable to lines, trunks and service circuits as well as office code translation information are defined by translation data which is unique to the lines and trunks of the office.

Accordingly, when a new office is installed, the problems of assuring operability of the generic portion of the program are minimized. Further, as an office grows either in size, traffic requirements or features permitted by the generic program, the generic portion of the program need not be disturbed and the problems attendant such growth or change are minimized.

In accordance with one feature of our invention, program controlled telephone switching offices are classified as to their maximum traffic handling capacity and range of service features and a data processor which is suitable for that class of office is arranged to execute a generic program in accordance with office parameters which define the unique characteristics of the office. The data processor and generic program for a given class of office are independent of the unique characteristics of the office and the operation of the data processors in the individual offices are governed by data which define the unique office characteristics.

In accordance with another feature of our invention, the generic program which is suitable for all offices of a class is located in identical absolute memory addresses in each office of the class.

In accordance with another feature of our invention, the parameter information which is required to define the unique characteristics of a telephone office is located in the memory system apart from the generic program.

The above and other objects and features of this invention will be more readily understood from the following description when read with respect to the drawing in which.

Figure 3:
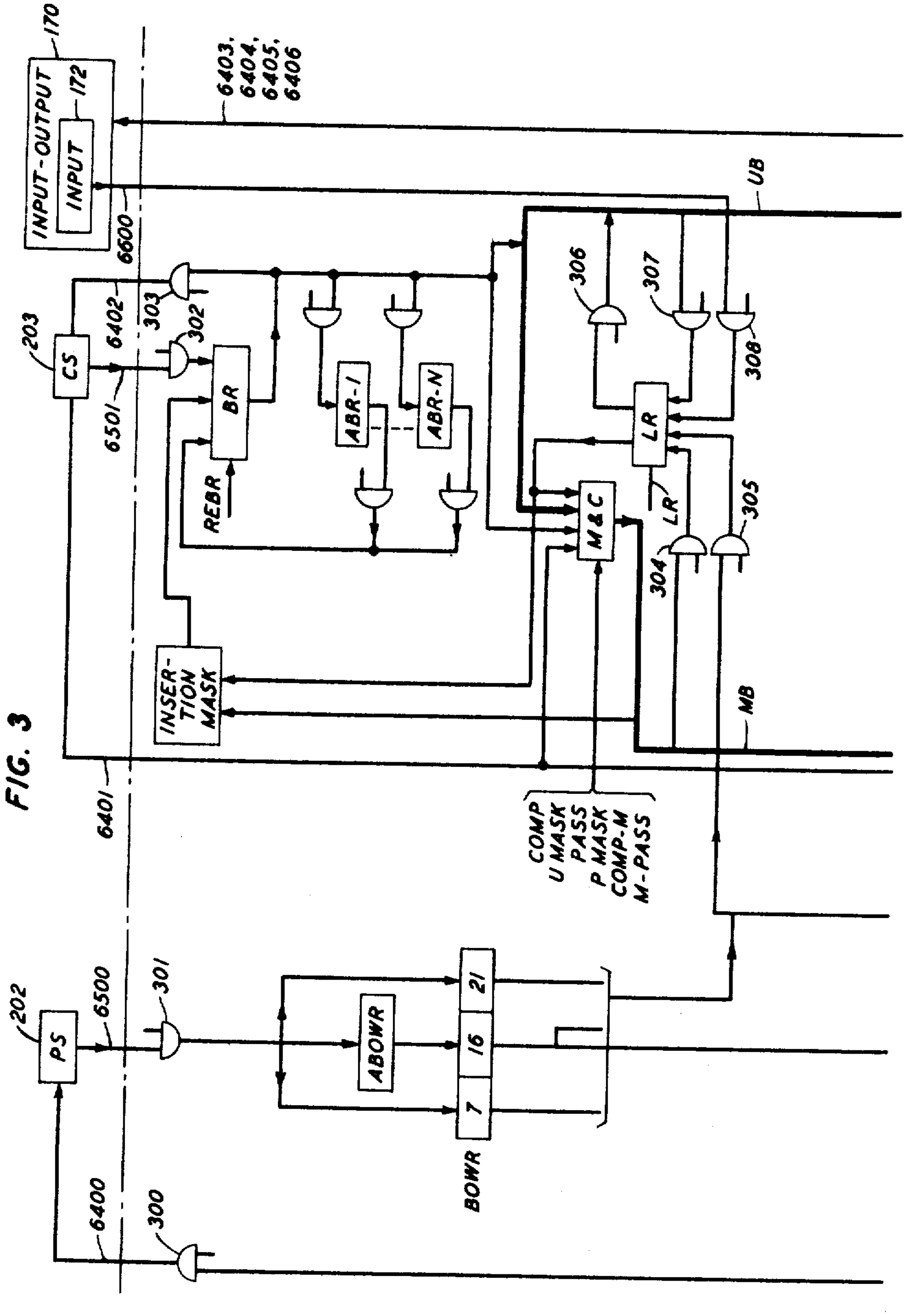
Figure 4:
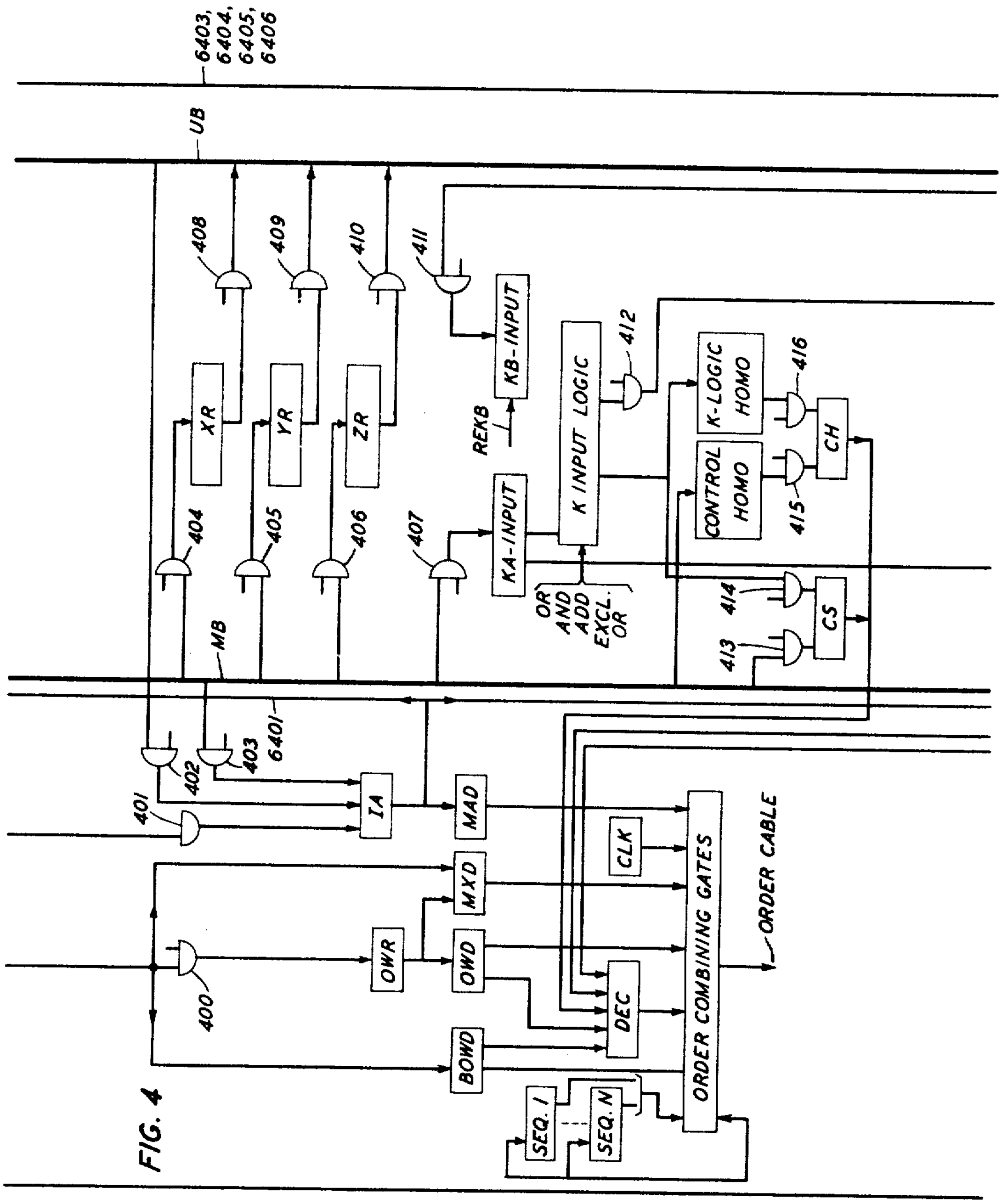
Figures 5, 10:
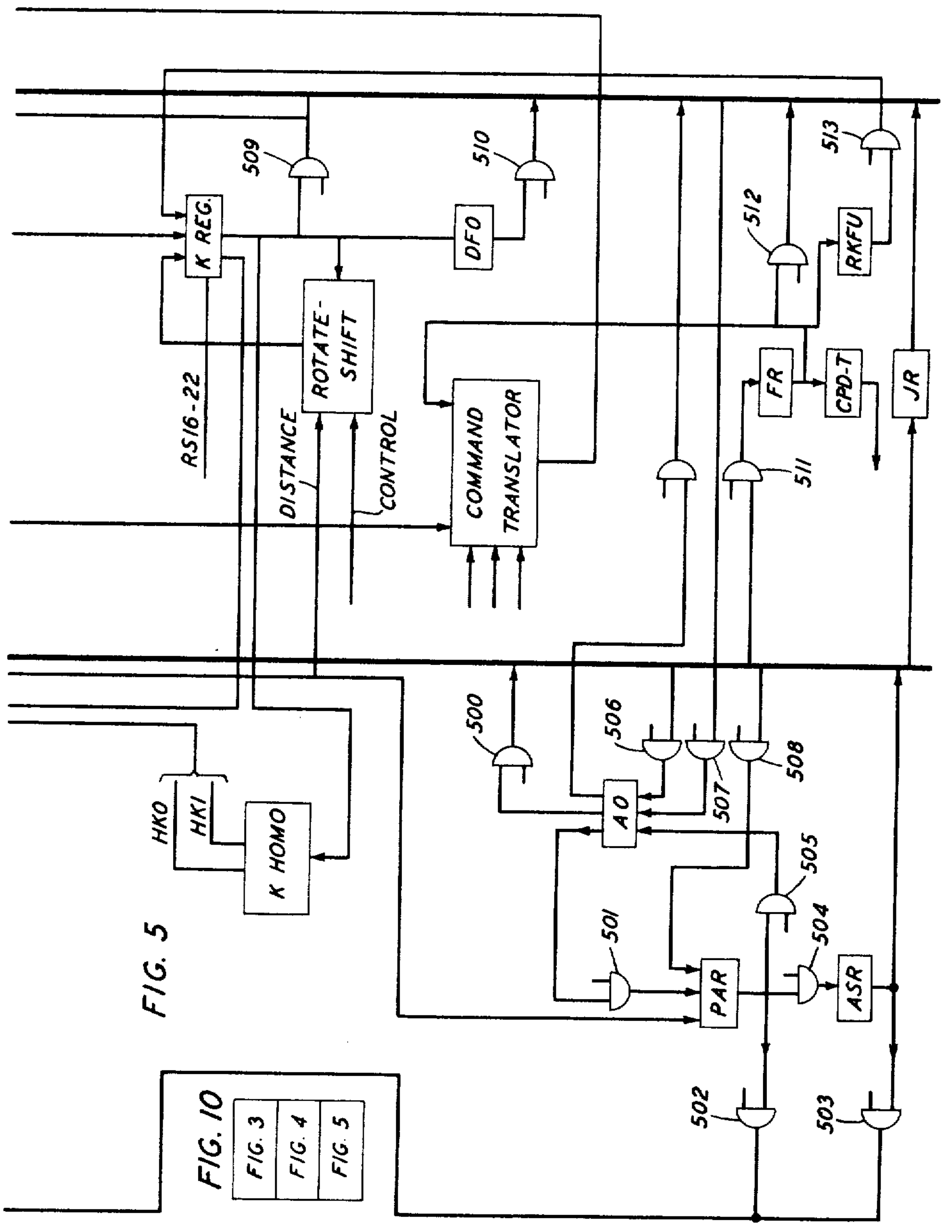
Figure 6:
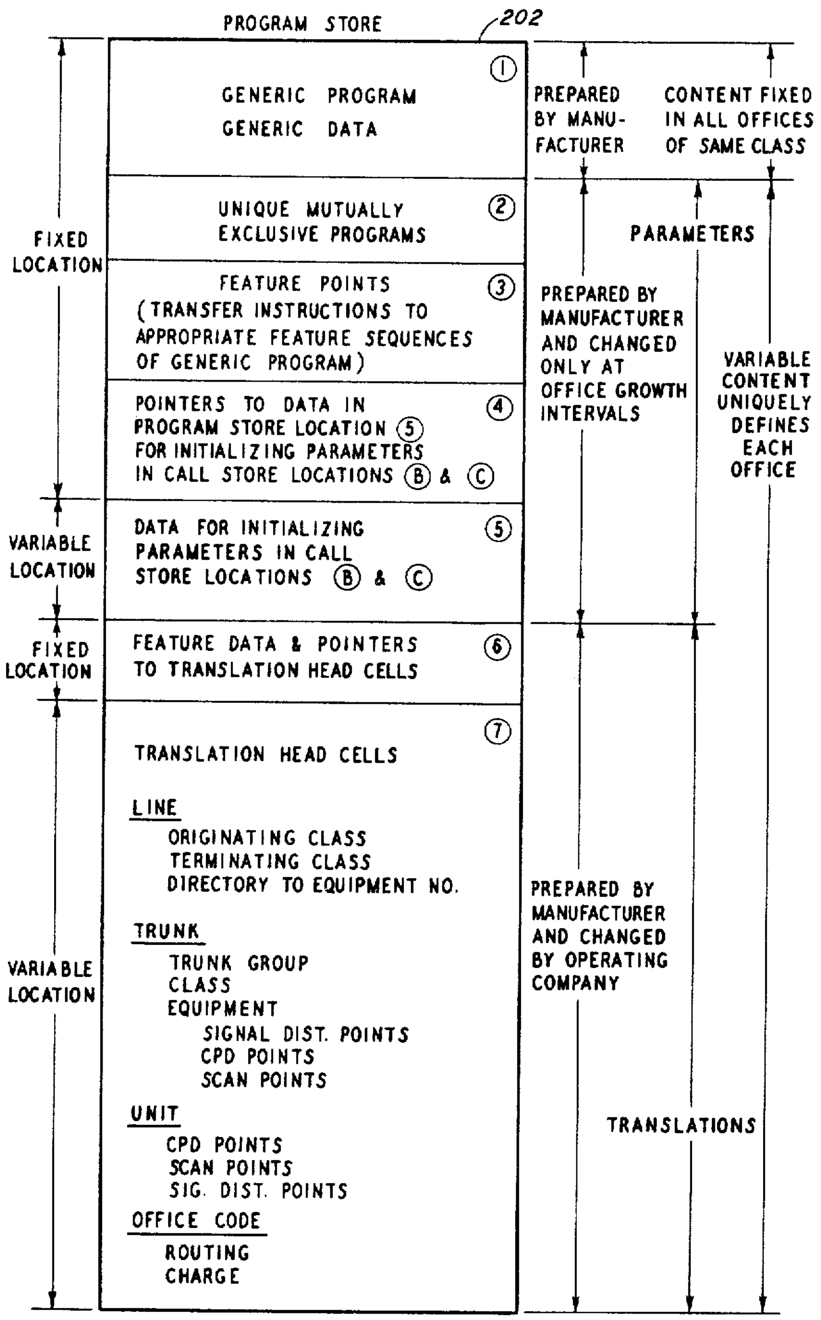
Figure 7:
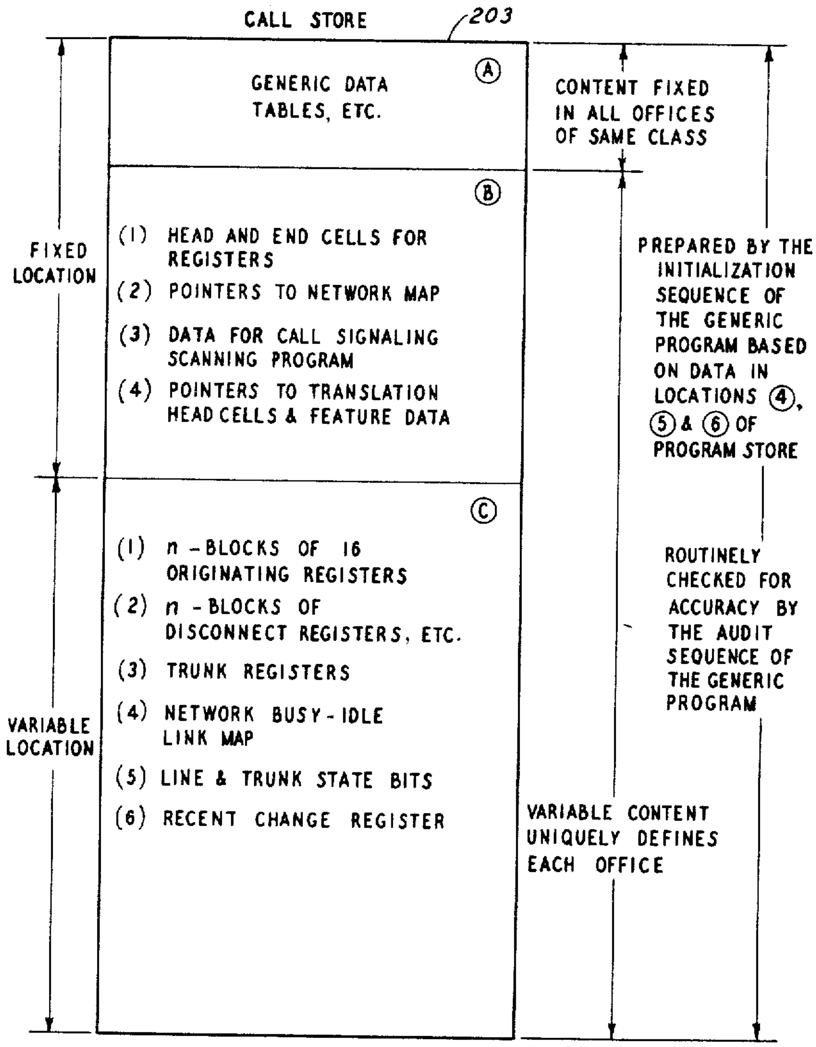
Figure 8:
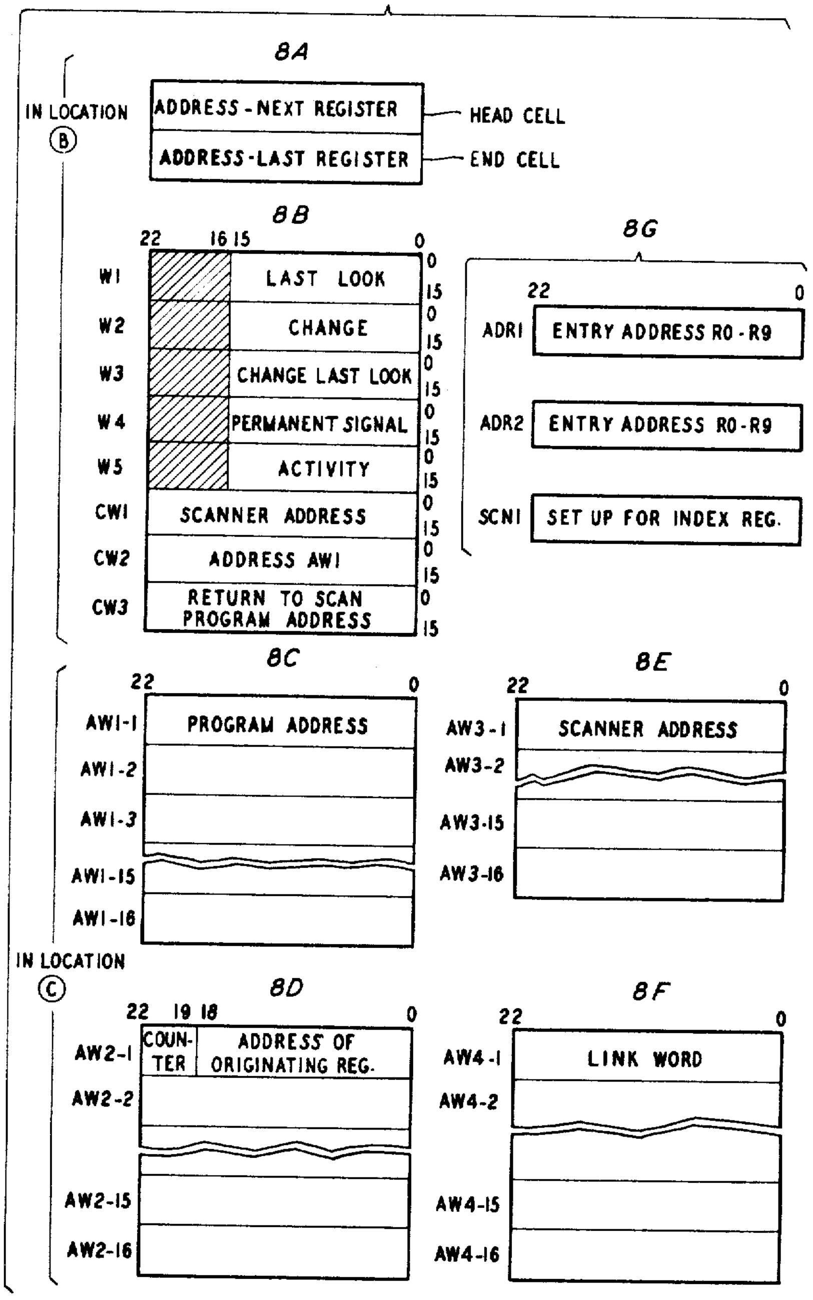
Figure 9:
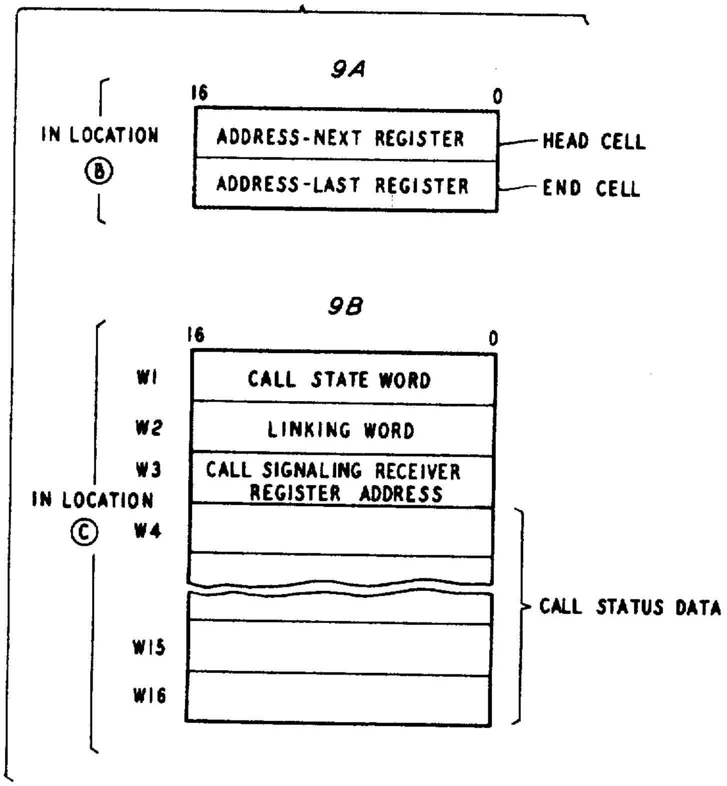

FIGS. 3 through 5, arranged as shown in FIG. 10, are a block diagram of a central processor;

FIG. 6 shows the arrangement of information in the semipermanent system memory in accordance with this invention;

FIG. 7 shows the arrangement of information in the temporary system memory in accordance with this invention;

FIGS. 8 and 9 schematically show the layout of certain data in the call store; and FIG. 10 is a key sheet showing the arrangement of FIGS. 3 through 5.

Figure 2:
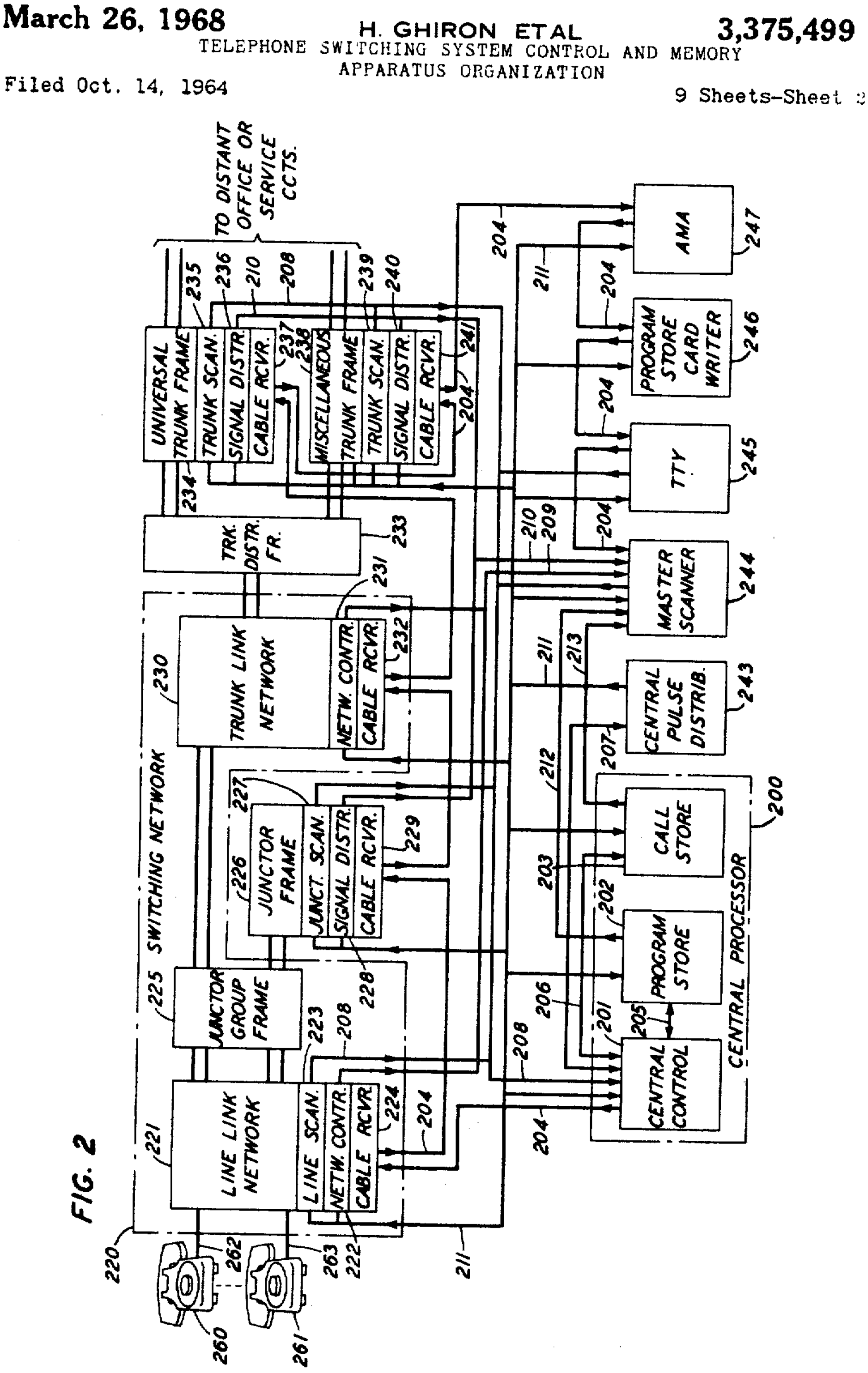
FIG. 2 is a general block diagram of a telephone switching system in accordance with the broad aspects of this invention.

The following description is directed to the organization of information in the memory system of a telephone switching system such as is disclosed in the copending application of A. H. Doblmaier-R. W. Downing-M. P. Fabisch-J. A. Harr-H. F. May-J. S. Nowak-F. F. Taylor-W. Ulrich, Ser. No. 334,875, filed Dec. 31, 1963. In this system, as seen in FIG. 2, the memory system comprises a semipermanent memory (Program Store 202) wherein the generic program (with the exception of minor maintenance programs) and certain data which is only occasionally changed are stored and a temporary memory (Call Store 203) wherein a few maintenance programs and data which is subject to rapid variation are stored. Although the following description is shown in the context of such a memory system, the principles are equally applicable to a telephone switching system having but one type of memory and not necessarily employing either the same system organization, the same data processor (Central Control 201) or even providing the same services and functions.

A complete understanding of the principles involved in providing program control of a telephone switching office may be acquired from W. A. Budlong-G. G. Drew-J. A. Harr, United States Patent 2,955,165, issued Oct. 4, 1960, and the copending application of Doblmaier et al., Ser. No. 334,875, filed Dec. 31, 1963. The details of the program required to perform the specific functions of a telephone switching office are not a necessary element of the understanding of our invention, and such details would merely tend to confuse the following description of our invention.

A telephone switching office has as its prime objective the provision of service to pluralities of communication paths; i.e., lines and trunks, in accordance with the requirements of the communication paths. The principal service rendered to the communication paths is the establishment of connections in accordance with information obtained from a calling communication path; however, as is well known, modern telephone switching offices have provisions for a variety of services and accommodate a number of classes of communication paths. For example, there are private lines, two-party lines, private branch exchange lines, et cetera. Similarly, there are a large number of types of trunk circuits such as incoming trunks, outgoing trunks, and operator trunks; and associated with both the lines and trunks there are numerous types of signaling systems employed. In addition, modern telephone switching offices provide many unusual services to the subscribers such as TOUCH-TONE call signaling, temporary call transfer, et cetera. Although two offices may serve similar numbers of subscriber lines, the traffic handling requirements of the two offices may vastly disagree. For example, one office may be in a business community wherein there is an extremely high calling rate while the other office may be in a suburban area which experiences a relatively low calling rate.

Each of the items discussed above, whether it be an item relating to the type of service afforded a line, the type of signaling employed on a line or trunk, the character of the trunk, or the traffic handling capacity of the office, contributes to the uniqueness of the office. Although, initially, an office may be required to serve limited classes of lines and trunks and to provide extremely limited service features, provisions must be made for their availability for future growth. By way of over simplification, the office program comprises a large number of program routines and it may be considered that a separate routine is required to implement each of the various service features and that separate routines are required to serve each of the various classes of lines, trunks and characteristics attributable to such lines and trunks.

SWITCHING SYSTEM ORGANIZATION

Figure 1:
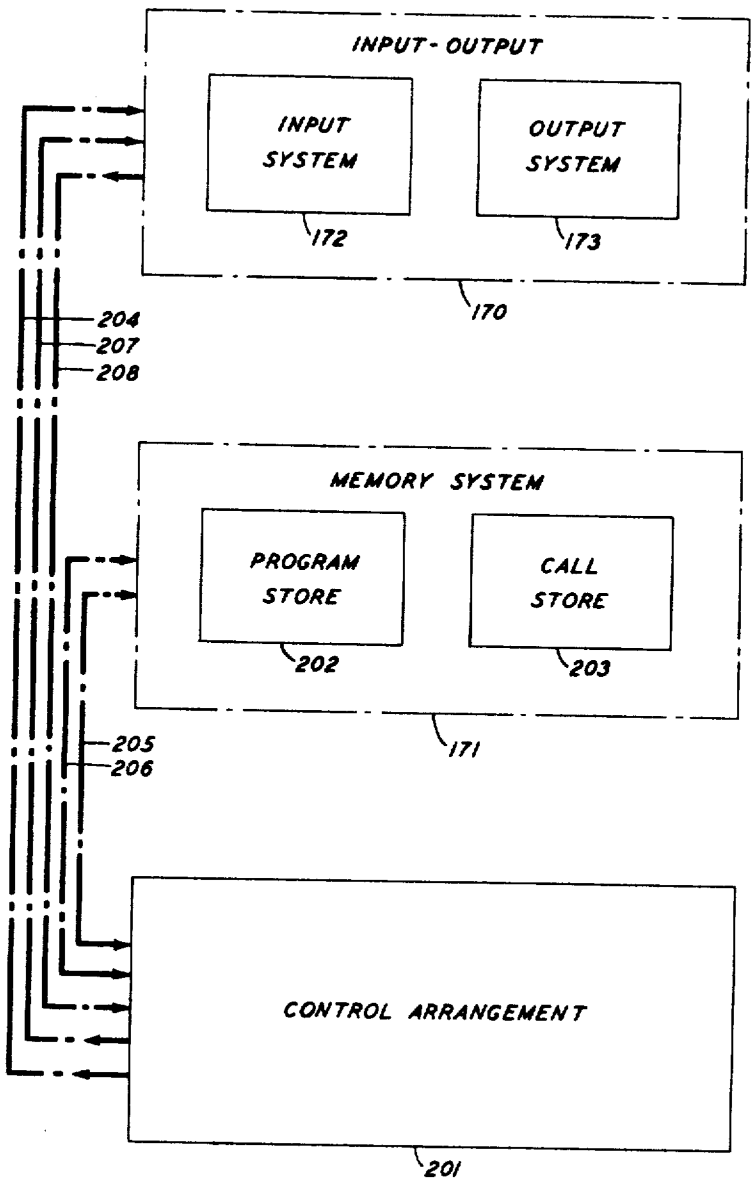
FIG. 1 is a general block diagram of a data handling system.

FIG. 1 is a general block diagram of a program controlled data handling system. The Control Arrangement 201 is arranged to read information (both instructions and data) from the Memory System 171 and to write information (data) into the Memory System 171. The control arrangement executes sequences of program order words obtained from the Memory System 171 and generates output signals for controlling the Input-Output System 170. In this one illustrative embodiment the Memory System 171 comprises a Program Store 202 which is a semipermanent memory wherein both sequences of program order words and data are stored and a Call Store 203 which is an erasable memory wherein data is stored.

The Control Arrangement 201 in the course of executing the sequence of program order words obtained from the Memory System 171 operates upon information obtained from the Input System 172 via Cable 208 and in response to this information generates signals for controlling both the Input System 172 and the Output System 173. As will be seen in the following discussion, the illustrative telephone switching system of FIG. 2 corresponds in general organization to the data handling system of FIG. 1.

FIG. 2 is a schematic block diagram of a telephone switching system such as is disclosed in the copending application of Doblmaier et al., Ser. No. 334,875, filed Dec. 31, 1963. In this system there are a plurality of subscriber sets such as 260, 261 which are connected to the Switching Network 220 by way of Subscriber Lines 262 and 263. There are shown to the right of FIG. 2 two types of trunk frames. The Universal Trunk Frame 234 is arranged to accommodate a large variety of trunk and service circuits which require a certain fixed number of scan points and control points, while the Miscellaneous Trunk Frame 238 is arranged to accommodate those trunks and service circuits which, because of their complexity, require a number of scan or control points in excess of those permitted for circuits of the Universal Trunk Frame 234. Each of the Trunk Frames 234 and 238 comprises trunk and service circuits, a Trunk Scanner such as 235 and 239, Trunk Signal Distributors such as 236 and 240 and cable Receiver Circuits 237 and 241. The Switching Network 220, under the control of commands from the Central Processor 200 selectively provides connections between lines such as 260 and 261, between trunk circuits, and between lines and trunk circuits.

The Central Processor 200 includes the Program Store 202 which contains sequences of program order words and the relatively fixed system data; the Call Store 203 which is an electrically alterable memory and which contains the more rapidly changing system data; and the Central Control 201 which is arranged to obtain information from the Program Store 202 and the Call Store 203, to write information into the Call Store 203, and to execute the sequences of program order words obtained from the Program Store 202. The central control responds to order words obtained from the Program Store 202, to generate commands for controlling the Switching Network 220, the elements of the Trunk Frames 234 and 238, the Central Pulse Distributor 243, the Master Scanner 244, the Teletype Unit 245, the Program Store Card Writer 246, and the Automatic Accounting Tape Unit 247. The Central Pulse Distributor 243 is effectively a translating circuit which accepts address and command information from the Central Control 201 via the Cable 207 and, in turn, generates electronic speed output pulses on the individual conductors of Cable 211. The central pulse distributor is a high speed device which is used for enabling system elements such as the Network Controllers 222 and 231 and for controlling portions of the trunk circuits of Frames 234 and 238.

The Master Scanner 244 is responsive to commands from the central control over Bus 204 and is effective in response to such commands to interrogate certain test points throughout the system and the high speed scan points which are associated with service circuits which are employed in detecting and recording call signaling information such as dial pulsing, TOUCH-TONE, MF, et cetera. As shown in FIG. 2, the Bus 204 extends from the Central Control 201 through the Cable Receivers 204, 229, 232, 237 and 241, the AMA Circuits 247, the Program Store Card Writer 246, the TTY 245 and the Master Scanner 244.

The Teletype Unit 245 and the Program Store Card Writer 246 are administrative devices and the knowledge thereof is not necessary for an understanding of this invention. Similarly, the Automatic Accounting Unit 247 serves to record the details required for billing subscribers for telephone service rendered.

CENTRAL PROCESSOR

The Central Processor 200, as seen in FIG. 2, comprises the Central Control 201, the Program Store 202, and the Call Store 203. The Central Control 201, shown below the dotted line in FIG. 3 and in FIGS. 4 and 5, performs system data processing functions in accordance with sequences of program order words. The program order words fall into two general classifications, namely, decision orders and nondecision orders.

Decision orders are generally employed to institute desired actions in response to present conditions with regard to lines or trunks served by the switching system or present conditions with respect to the maintenance of the system.

Decision orders dictate that a decision shall be made in accordance with certain observed conditions and the result of the decision causes the Central Control 201 to advance to the next order of the current sequence of order words or to transfer to an order in another sequence of order words. Decision orders are also termed "conditional transfer orders."

Nondecision orders are employed to communicate with units external to Central Control 201 and to both move data from one location to another and to logically process the data in accordance with certain defined instructions. For example, data may be merged with other data by the logical functions of AND, OR, EXCLUSIVE-OR, product mask, et cetera, and also data may be complemented, shifted, and rotated.

Nondecision orders perform some data processing and/or communicating actions, and upon completion of such actions most nondecision orders cause the Central Control 201 to execute the next order in the sequence. A few nondecision orders are termed unconditional transfer orders and these dictate that a transfer shall be made from the current sequence of program orders to another sequence of order words without benefit of a decision.

The sequences of order words which are stored principally in the program store comprise ordered lists of both decision and nondecision orders which are intended to be executed serially in time. The processing of data within the central control is on a purely logical basis; however, ancillary to the logical operations, the Central Control 201 is arranged to perform certain minor arithmetic functions. The arithmetic functions are generally not concerned with the processing of data but, rather, are primarily employed in the process of fetching new data from the memories such as from the Program Store 202, the Call Store 203, or particular flip-flop registers within the Central Control 201.

The Central Control 201, in response to the order word sequence, processes data and generates and transmits signals for the control of other system units. The control signals which are called commands are selectively transmitted to the Program Store 202, the Call Store 203, and to the Input-Output System 170.

The Central Control 201 is, as its name implies, a centralized unit for controlling all of the other units of the system. A Central Control 201 principally comprises:

A. A plurality of multistage flip-flop registers, such as XR, YR, ZR, JR and K reg;

B. A plurality of decoding circuits, such as OWD, BOWD and MXD;

C. A plurality of private bus systems for communicating between various elements of the central control, such as the masked bus MB and the unmasked bus UB;

D. A plurality of receiving circuits for accepting input information from a plurality of sources, such as 301, 302, 308;

E. A plurality of transmitting circuits for transmitting commands and other control signals, such as 300, 303, 502, 503, and the command translator;

F. A plurality of sequence circuits, such as SEQ1–SEQN;

G. Clock sources, such as CLK; and

H. A plurality of gating circuits (order combining gates) for combining tuning pulses with D-C conditions derived within the system.

The operation of these elements is further described in the above-mentioned Doblmaier et al. application.

The Central Control 201 is a synchronous system in the sense that the functions within the Central Control 201 are under the control of a multiphase Microsecond Clock 4CLK which provides timing signals for performing all of the logical functions within the system. The timing signals which are derived from the Clock 4CLK are combined with D–C signals from a number of sources in the order combining gate circuit. The details of the order combining gate circuit are not shown in the drawing as the mass of this detail would merely tend to obscure the inventive concepts of this system.

ORGANIZATION OF INFORMATION IN THE MEMORY SYSTEM

FIG. 6 shows the organization of information in the Program Store 202 in seven locations labeled ① through ⑦. In the figure the arrangement of information and the size of the blocks representing the seven locations are not indicative of the absolute locations and sizes of the various blocks but, rather, are merely illustrative of the principles of this invention. The same is true of the three blocks labeled Ⓐ, Ⓑ, and Ⓒ in FIG. 7 which shows the arrangement of information in the Call Store 203.

*Generic program—generic data*

In FIG. 6 location ① contains the generic program and the generic data which is common to all offices of a particular class. The information in this area is always located at the same absolute addresses in the program store and the content is fixed for all offices of the same class. These assignments are made by the manufacturer and, generally, the information is placed in the memory by the manufacturer. The generic program comprises, with only minor exceptions, all of the program sequences required to implement both the call processing and maintenance functions of the class of office for which a program is prepared. The minor exceptions comprise the unique mutually exclusive programs, which are in location ② in the program store and which will be described later herein, and a few maintenance programs which are located in the call store and which are not further described herein.

The generic data comprises information for generating tables which are frequently used in the course of call processing. The generic program, in accordance with this data, is able to prepare the tables and store them in location Ⓐ in the call store. An example of the type of table which is generated and stored in the call store is a "diagonal table." The data word employed in the illustrative embodiment comprises 23 bits of information. The diagonal table comprises 23 words arranged sequentially in location Ⓐ of the Call Store 203. In the first word the rightmost bit position is a binary "1" and all other bit positions are binary "0." In word 2 the second bit position is a binary "1" and the first and other bit positions are binary "0." In the remaining words of the table the bit position corresponding to the word number is a binary "1" and all other bit positions are binary "0." Thus the name diagonal table obtains.

The generic program and the generic data are prepared by the manufacturer, and this information in the Program Store 202 is generally changed only if the growth of the office is such that the office becomes a member of a new generic class. Such a change is most unlikely since a single generic program covers both a wide range of traffic and a wide range of service features.

*Mutually exclusive lengthy programs*

There are certain program sequences which are quite lengthy and which are employed in an office on a mutually exclusive basis. For example, when an office is installed a particular concentration ratio is specified for the line link network. In one office a ratio of 2:1 may be employed while in other offices other ratios may be employed. A single ratio applies to the entire office. The program sequences which are dependent on office concentration ratio are examples of programs employed in the office on a mutually exclusive basis. Although it would be possible to place all of these mutually exclusive programs in the generic program location ①, such assignment of space would be wasteful. Accordingly, in the case of lengthy sequences which are employed in an office on a mutually exclusive basis the appropriate sequences which meet the requirements of the office at the time of installation are placed in location ② of the program store.

The information which uniquely defines an office is divided into two general categories, namely, parameters, and translations. The unique mutually exclusive programs comprise the first element of the office parameters. Office translations will be described with respect to locations ⑥ and ⑦ of the Program Store 202.

In a telephone switching system the traffic handling capacity of the Network 220 is a function of the concentration ratio of the Line Link Network 221. An office is assigned only a single concentration ratio for all line link networks; therefore, the programs relating to the location of an idle path through the line link network and to the control of the line link network may be uniquely defined at the time the office is installed. The program sequence which are dependent upon the line link network concentration ratio are quite extensive; therefore, considerable space may be saved in the Program Store 202 by placing only the sequences related to the prescribed concentration ratio in the Program Store 202. These program sequences are a prime example of mutually exclusive program sequences.

*Feature points*

The generic program in location ① also includes many relatively short sequences of program order words which are employed on a mutually exclusive basis in each office of a class. Since these sequences are short, little space would be saved by selecting the appropriate sequences at the time of installation and compiling them in location ②. The choice of the selection of such sequences is accomplished by means of transfer instructions, termed "feature points," which are in location ③ in the program store. An example of a feature which may be selected by means of a feature point in location ③ relates to the interpretation of an initial "0" in subscriber call signaling information. In certain offices when a subscriber dials or key pulses an initial "0," a call to the operator is intended; however, in other offices the initial "0" if followed by additional call signaling digits indicates a "person-to-person direct distance dialing call." The call processing sequence, which interprets call signaling information as it is registered, includes an unconditional transfer instruction to an absolute address in location ③. The program store at this absolute address contains another unconditional transfer instruction to an appropriate absolute address in location ① of the program store. The transferred to address in location ① contains the first instruction of the sequence which applies to the particular office. That is, if person-to-person direct distance dialing is permitted in an office, a program sequence of the generic program which implements this service will be reached via the transfer instruction at the feature point. Similarly, if person-to-person direct distance dialing is not a feature of the office, a program sequence which implements a connection to the operator will be reached in the generic program. This is but one example of a feature which applies to the entire office and which may be reached by means of the feature points found in location ③ of the Program Store 202.

*Equipment parameters*

As previously stated, a single generic program serves offices having many distinguishing physical characteristics. The physical characteristics of interest to the following discussion are those which define the size of the office and the traffic handling capacity of the office. As employed herein the term "office size" relates to the number of lines and trunks served by the office and the term "traffic handling capacity" relates to the equipments which are provided to serve the lines and trunks. The following discussion does not include a description of features and services associated with the lines and trunks as this subject is subsequently covered herein under the general heading of "translations."

The information in locations ④ and ⑤ of the Program Store 202 are employed in initializing the information in locations Ⓑ and Ⓒ of the Call Store 203. There is not a one-to-one correspondence between the information in locations ④ and ⑤ and the information in locations Ⓑ and Ⓒ. The generic programs include program sequences termed the "initialization program sequences" and the "audit program sequences." These program sequences include instructions to read data in location ④ of the program store. As shown in FIG. 6, the information in location ④, like the information in locations ① through ③, is always at the same absolute address in the Program Store 202. The information in location ④ comprises pointers to data in location ⑤ of the program store. The data in location ⑤ is required by the initialization sequence to generate the initial information to be stored in locations Ⓑ and Ⓒ of the Call Store 203. The amount of data to be stored in location ⑤ varies from office to office; therefore, location ⑤ is not assigned the same fixed location in every office and the number of word locations assigned varies from office to office. The pointers in location ④ serve to locate the initialization data for the initialization and audit program sequences of the generic program.

The call processing sequences do not require access to the data in program store locations ④ and ⑤ since this data is only required to initialize the information in locations Ⓑ and Ⓒ of the Call Store 203. The call processing sequences have direct access to the information in location Ⓑ of the call store through instructions which are included in these sequences. The call processing sequences have access to the data in location Ⓒ of the call store by means of the data obtained from location Ⓑ.

The data in location Ⓑ defines the equipment configuration employed in the office. It should be noted that there are basic equipment configurations of the central processor for a particular generic class of office and that the information in locations Ⓑ and Ⓒ is not concerned directly with these basic configurations. In the Central Processor 200 of FIG. 2 the Central Control 201 always comprises two functionally equivalent central controls, the Program Store 202 always comprises at least two functionally equivalent program stores and the Call Store 203 always comprises at least two functionally equivalent call stores. The numbers of Program Stores 202 and Call Stores 203 are a function of office size and traffic handling capacity and the parameters in location Ⓑ reflect this fact. This will be understood from the following discussion.

The call processing sequences employ a large amount of bulk memory space in the Call Store 203 to record data which is accumulated during the course of serving a call and to maintain a record of the availability of equipments engaged by calls in process or by trouble conditions. A portion of the memory which is employed to record accumulated data is termed "a register" herein. There are, as explained below, several types of registers which are arranged in groups in location Ⓒ in the Call Store 203. An originating register is an example of a register employed in accumulating data during the processing of a call. The general organization of an originating register in the Call Store 203 is shown in FIG. 9. Every office comprises a plurality of originating registers and there are two call store words which are common to all of the originating registers of the office. The two common words are termed the head cell word and the end cell word. The head cell word contains the address of the next originating register to be assigned and the end cell word contains the address of the last originating register to be assigned. Originating registers are assigned in the order of their release. That is, the originating register which has been idle the longest period of time is the first register to be assigned. The common head cell and end cell entries are shown in FIG. 9A. These entries are in location Ⓑ of the Call Store 203 and always appear at the same absolute addresses in memory in all offices of the same class.

In this one illustrative embodiment an originating register comprises a block of sixteen call store words arranged as shown in FIG. 9B. The first word of the register is the call state word. During the time that an originating register is engaged by a call the call may be in a number of states. For example, a connection may be established between the calling line and the call signaling receiver. Before the calling subscriber has transmitted the first dialed digit the call signaling receiver transmits dial tone to the calling subscriber. However, after the first digit has been received the dial tone is removed. These are two examples of call states which can be defined by the call state word in the originating register.

The second word of the originating register is the originating register link word. The originating registers arranged in a linked list and the link word in each originating register indicates the address of the next originating register to be assigned. It is by this mechanism that originating registers are assigned in the order in which they are released. The linked list thus comprises a two word entry (head cell and end cell, FIG. 9) which is common to the linked list and linking entries which are individual to each of the articles which may be assigned (in this one case, originating registers). The two word entry is in location Ⓑ of the Call Store 203. In FIG. 7 item 1 in location Ⓑ is indicated to be the head and end cells for registers.

When the system is first initialized the head cell entry in location Ⓑ will identify the first originating register as the next to be assigned and the end cell entry will identify the last originating register to be the last to be assigned. The link word (word two) associated with the first originating register will show the second register to be the next to be assigned after the first has become engaged, et cetera, in numerical order through the remaining items to be assigned. After the system has started to process calls registers will be held for varying periods of time depending upon the speed with which the subscriber dials or pulses call signaling information and the relative speeds with which the central processor is able to establish calls and thus release registers. Accordingly, after the system has been in service a random linking of items to be assigned will exist. That is, no longer will the items be assigned in strict numerical sequence but, rather, the longest idle register will always be the next register which is seized to serve a call. This arrangement serves a very useful purpose in that all the registers are used even during very light periods of traffic. Therefore, any troubles which may occur in a register will be detected during normal operating periods and not only when a heavy traffic situation occurs.

Additionally, the use of a linked list permits a single pair of words (FIG. 8A), namely, head cell and end cell words, to suffice for every office of the class without dependence on the number of originating registers in the office. This arrangement facilitates office growth since the addition of one or more groups of registers merely requires the assignment of space within the call store location Ⓒ and the inclusion of the new registers in the linked list. Accordingly, the information in the originating registers which were part of the system before the addition need not be disturbed and calls are not interrupted.

The originating registers comprise blocks of data in the Call Store 203. Each register comprises sixteen words which for purposes of programming economy occupy sixteen successive word locations in the memory. The word blocks of the many originating registers, however, may occur randomly in the memory since the link word gives the address in memory of the next originating register.

The third word of each originating register is reserved for the address of a call signaling receiver register. Words 4 through 16 are reserved for accumulating call signaling information. As will be seen in the following description, call signaling information is detected by call signaling receivers, placed in call signaling receiver registers, and subsequently transferred to an associated originating register. Call signaling receivers are located in the Universal Trunk Frame 234 of FIG. 2, terminate on the Trunk Link Network 230, and are arranged to be responsive to call signaling information received from a connected calling line. That is, when a subscriber's station such as 260 or 261 initiates a call, the Central Processor 200 recognizes the request for service and establishes a connection through the Line Link Trunk Network 221, the Junctor Grouping Frame 225, the Trunk Link Network 230 and the Trunk Distributing Frame 233 to an idle call signaling receiver in the Universal Trunk Frame 234. The call signaling receiver responds to call signaling information. The Central Processor 200 executes call processing program sequences and generates command signals which cause the Trunk Scanner 235 and the Master Scanner 244 to regularly examine information terminals (scan points) within the call signaling receiver to obtain indicatons of the call sgnaling receiver's responses to call signaling information from the connected orginating subscriber's line. The Central Processor 200 receives scanner responses over the Communication Path 208, interprets the scanner responses via a call signaling scanning program and records these responses in words of associated call signaling receiver registers in location Ⓑ.

Call signaling receivers are associated on a one-for-one basis with call signaling receiver registers which are shown schematically in FIGS. 8A, 8C, 8D, 8E and 8F. A single linked list is adequate to show the availability of the call signaling receivers and their associated call signaling receiver registers. The head and end cells for this linked list are shown in FIG. 8A and like the head and end cell entries for the originating registers these two words are in location Ⓑ of the Call Store 203. The linking words are shown in FIG. 8F with one linking word (AW4–1, AW4–2, etc.) for each call signaling receiver to be assigned.

The call signaling receiver registers comprise the three blocks shown in FIGS. 8C, 8D and 8E. The words in these three blocks are labeled Auxiliary Word 1, Auxiliary Word 2 and Auxiliary Word 3, respectively. In this arrangement the first auxiliary word (AW–1) contains the program store address of the generic program sequence which is required to perform the functions associated with the particular originating register. The second auxiliary word (AW–2) comprises nineteen bits. Bits 19–22 comprise a counter for registering the received digit and bits 0–18 comprise the address of an originating register which has become temporarily associated with a call signaling receiver register. That is, in the course of serving a request for service from a subscriber's line the Central Control 201 first assigns an originating register to the request and subsequently assigns a call signaling receiver and its associated call signaling receiver register to the request. This association of call signaling receiver register and originating register is noted in both the call signaling receiver register and in the originating register.

The third auxiliary word (AW–3) is reserved for the scanner address of TOUCH-TONE numerical interrogation points of a TOUCH-TONE call signaling receiver.

The originating registers are merely illustrative of many types of registers. For example, during the processing of a call the generic program employs ringing registers, disconnect registers, trunk group registers, et cetera. The principles by which the generic program communicates with the various registers are identical to those set forth above in case of originating registers and call signaling receiver registers. In each instance a single pair of words (head cell word and end cell word) completes the necessary tie between the generic program and the above registers.

Another example of the use of a few entries in location Ⓑ of the Call Store 203 to permit the generic program to communicate with a block of information in location Ⓒ is item (2), the pointers to the network map. The Switching Network 220 in this one illustrative embodiment comprises eight network stages. Four stages are included in the Line Link Network 221 and four stages in the Trunk Link Network 230. The Switching Network 220 comprises transmission paths, switches for establishing those transmission paths, and control circuits for selectively controlling the switches. Many other telephone switching networks include either lockout provisions for excluding busy links from a new connection or include a sleeve conductor for holding a busy connection and indicating the busy state of the elements of the connection. The Switching Network 220 does not include either lockout arrangements or sleeve connections and the availability of elements of the network is indicated by a network busy-idle link map which is in location Ⓒ of the Call Store 203. The size of the network busy-idle link map is a direct function of the traffic handling capacity of the office. The busy-idle map must include entries for each physical item of the network and must reflect the concentration ratios of the Line Link Network 221. Since the network busy-idle map is an item which varies with office traffic handling capacity, it is situated in location Ⓒ of the Call Store 203.

Communication between the sequences of the generic program, the sequences of the unique mutually exclusive programs and the network busy-idle link map is by way of pointers (Item 2) which are situated in location Ⓑ of the Call Store 203. A word in location Ⓑ is reserved for the maximum number of pointers which are required in the generic office. For example, if the maximum number of line link networks permissible in a particular class of office is 16, then 16 word locations will be reserved. This arrangement means that a small number of word locations are reserved and not used in the smaller offices of a class. This disadvantage, however, is minor compared to the ease with which additional network capacity may be added to the office and the over-all saving in memory capacity. That is, in accordance with this arrangement the network busy-idle link map may be distributed throughout a number of call stores and when a new network frame is added, network busy-idle link map space need only be assigned in location Ⓒ of the Call Store 203 and the pointer word in location Ⓑ reserved for the new network frame updated to show the assignment in location Ⓒ.

In the case of the network busy-idle link map, the amount of memory area required for a network frame is relatively extensive. Therefore, economies may be effected by providing pointers which permit the generic program or the mutually exclusive program to communicate with the network busy-idle link map. Where the total memory area required to serve the largest office of a generic class is relatively small, all of the space required to store that data may be reserved in location Ⓑ for the largest office of the class. The data for the call signaling scanning program falls into this latter category. In this one illustrative example logic word locations are required for each group of 16 call signaling receivers. Additionally, there are three common call store words required to serve all of the call signaling receivers of an office. The organization of data for the call signaling scanning program is illustrated schematically in FIGS. 8B and 8G. In the illustrative system a scanner is arranged to interrogate a group of 16 supervisory elements in parallel. Such a group of 16 elements is termed herein to reside in a scanner row. The maximum number of call signaling receivers contemplated in the particular class of office illustrated herein is 256. Therefore, a maximum of 16 scanner rows provides sufficient capacity for this maximum number of call signaling receivers.

In FIG. 8B scanner row addresses (CW1) are stored in a maximum of 16 word locations. The scanner row address defines both the scanner in which the row resides and identifies the particular row. In any given office the assigned scanner rows may run only through N; therefore, the word locations in the reserved block of 16 words in excess of N are wasted. However, if the scanner row addresses and the other data for the call signaling scanning program were stored in location Ⓒ, pointers would be required in location Ⓑ. Accordingly, not all of the words wasted by the arrangement employed herein would be saved. Additionally, the use of pointers to read this data requires additional machine time. Since scanning is a highly repetitive function of the system, minimizing the time required to execute the scanning sequences is extremely important. The economies to be effected by placing the data for the call signaling scanning program in location Ⓒ are relatively small; therefore, this data is situated in location Ⓑ.

The word blocks W1 through W5 illustrated in FIG. 8B similarly reserve one word per possible scanner row. In these blocks, however, only bit positions 0 through 15 of each word are employed. Within these bit positions the first bit of each word is assigned to the first scanning element of the corresponding scanner row, the second bit position to the second element of the scanner row, et cetera. Accordingly, in these word blocks corresponding bit positions of corresponding rows are assigned to the same scanning element.

The data stored in the block labeled CW2 comprises the address of the associated auxiliary words of the corresponding call signaling receiver registers. As previously noted, call signaling receivers and call signaling receiver registers are associated on a one-for-one basis. In FIG. 8B a single row, for example the "0" row, of each of the words W1 through W5 and CW1 through CW3 corresponds to a group of 16 call signaling receivers. Therefore, there are 16 call signaling receiver registers (FIGS. 8C through 8E) associated with each such row. The words AW1, AW2, and AW3 which comprise a call signaling receiver register are arranged in 48 consecutive word locations in location © of the Call Store 203. Accordingly, word AW2–1 is removed 16 word locations from word AW1–1 and word AW3–1 is an additional 16 word locations removed from word AW1–1. This arrangement facilitates programming.

The data stored in the block labeled CW3 of FIG. 8B comprises a program return address. That is, in the course of executing the call signaling scanning program a transfer may be made to a sequence to, for example, update one of the counters of the originating registers previously described. After the counter has been incremented, the processor returns to the execution of the call signaling scanning program at the point indicated by the address stored in the block CW3. Again there is one word for each possible scanner row.

There are three common entries shown in FIG. 8G and these are labeled ADR1, ADR2, and ACS1. The scanning of call signaling receivers is performed at timed interrupts. Scanning must be repeated approximately once every 10 milliseconds and in the illustrative system there are odd and even timed interrupts. Successive odd interrupts occur at 10 millisecond intervals and, similarly, successive even interrupts occur at 10 millisecond intervals. Odd and even interrupts occur at 5 millisecond intervals. In the illustrative embodiment approximately one-half of the scanner rows are served at the odd interrupt and the remaining half served at the succeeding even interrupt. Since time is to be minimized, only the word locations associated with the number of scanner rows should be addressed. Accordingly, the word ADR1 shown in FIG. 8G indicates the number of even rows to be scanned at each even interrupt and the word ADR2 indicates the number of odd rows to be scanned at each odd interrupt. The common word SCN1 shown in FIG. 8G is employed by the call signaling scanning program to set an index register which is employed in the course of executing the program.

In summary, since only minor memory space is wasted in any office of a class, space is reserved in location Ⓑ for all of the data required for the maximum number of scanner rows; however, since great economies may be effected, the associated call signaling receiver registers are placed in location © and communication between the program and these registers is by way of pointers in location Ⓑ.

*Translations*

In a modern telephone switching system and particularly in a program controlled telephone switching system there are many possible services and features which may be embodied in the operation of both subscribers' lines and trunks. Additionally, in any telephone switching office there must be provision for interpreting call signaling information requesting connections along with means for providing the information required to establish the desired connections. The office parameters, which have been described previously herein, relate to the office as a whole. There is similar data associated with the lines and trunks which defines the characteristics of the associated lines and trunks. This information is termed "translations" herein. Translation information is in location ⑦ of the Program Store 202 and communication between the call processing program sequences and the translation data is by way of pointers in location ⑥ of the program store. These pointers are repeated in the call store (location Ⓑ item 4). The pointers which provide access to the translations are always found at the same absolute addresses in both the program store and the call store for offices of a given generic class. The memory area required to store the office translations varies greatly from office to office. Accordingly, the pointers in locations ⑥ and Ⓑ provide access to other pointers (translation head cells) which are in location ⑦ and thus are not in fixed addresses. The pointers (translation head cells) in location ⑦ provide access to the various classes of translation.

In summary, the call processing sequences which are found in locations ① and ② of the program store have direct access to the pointers to translation head cells which are found in location ⑥. The call processing program sequences may thus communicate with the translation head cells in location ⑦ and through these head cells can communicate with the various translations found in location ⑦.

The exact translations employed in the illustrative system are not of great significance to the present invention. However, the isolation of the translation data from the memory area which was reserved for the generic program, the generic data, and the unique mutually exclusive programs is of great significance. This isolation permits the operating company to readily change translations to reflect subscribers' service requirements and effects substantial economies since the translations may be distributed through new program stores as the size of an office is increased.

The following discussion is intended to illustrate the types of features which are attributable to lines and trunks and which are implemented by means of translation tables in location ⑦. With regard to lines there are a number of originating classes. For example;

(1) A line may be part of a business group of lines and have restricted calling rights.

(2) A line may be serving a physically handicapped person and every call origination requires the assistance of an operator. This type of line is called a manual origination line.

Similarly, there are a number of terminating classes of lines. For example, one line may be part of a group of lines and in the event that a line in the group which is called is busy, the system must automatically complete a connection to another line of the same group.

The telephone switching office of the illustrative embodiment permits a random association of directory numbers of the office and office equipments; therefore, there must be provision for translating a called directory number to an equipment number so that the central processor may establish the appropriate connection.

There are, similarly, a number of features which may be embodied in a trunk circuit and, additionally, trunks inherently serve different functions such as incoming trunks, outgoing trunks, two-way trunks, operator trunks, special announcement trunks, et cetera. The translations serve to define both the function and the features of the trunks and, additionally, set forth the assignment of output points of the signal distributors, the central pulse distributors, and the scanners to the various trunks.

Although the offices of a class are standardized to the greatest possible extent, there is certain wiring in association of equipments which is done on a per office basis. For example, the assignment of CPD points, scan points, and signal distributor points to various pieces of equipment varies from office to office. Therefore, there are unit translations in location ⑦ which reflect the associations of such equipments.

As previously noted, call signaling information must be interpreted and a path found for establishing the desired connection. This is accomplished by means of the office code translations which are also in location ⑦. The office code translations provide information for routing the call and establish the basis for charge for the call.

SUMMARY

As previously noted herein, there are defined classes of telephone switching offices and for each class of office there is a basic processor configuration and a body of information termed "the generic program" and "the generic data" for that class of office. The basic processor configuration includes certain basic memory arrangements and within this arrangement the generic program and the generic data for a given class of office are always located at the same absolute addresses within the memory.

Further, as explained earlier herein, at the time of installation no two offices could possibly be identical in all characteristics and, additionally, no two offices would grow identically. Advantageously, therefore, in accordance with this invention, the unique characteristics of each office are defined by office parameters (including translations). The office parameters and translations are not intermingled with the generic program and generic data in the memory arrangement. The parameters include a number of types of data which permit the generic program to communicate with various elements of the system which vary from office to office. This data which enables the generic program to communicate varies in content from office to office; however, the data is always placed at identical addresses for all offices of a class. By way of example only, this data includes the following items:

(1) Head and end cells for register groups;
(2) Pointers to the network map;
(3) Data for the call signaling scanning program;
(4) Pointers to translation head cells; and
(5) Feature data.

By way of items 1, 2, and 4 the generic program is able to communicate with functional blocks of memory which do not contain the generic program or generic data and by way of data of item 3 the generic program is able to communicate with scanners which vary in number from office to office.

Similarly, the unit translations in area 7 of the program store permit the generic program to communicate with various system components through the central pulse distributor, the scanner and the signal distributors.

The above arrangements are but illustrative of the principles of this invention and it is obvious to one skilled in the art that other arrangements may be employed without departing from the teaching, spirit, and scope of this invention.

What is claimed is:

1. Control apparatus for a program controlled telephone switching system comprising:

first memory means comprising a first plurality of word locations at particular fixed memory addresses, each of said word locations of said first plurality being conditioned to define fixed program information for a given class of telephone switching system, second memory means comprising a second plurality of word locations at other particular fixed memory addresses, said word locations of said second plurality being conditioned to define data which is unique to each system of said given class, third memory means, said defined data of said second memory means comprising:

(A) the functional assignment of word locations of said third memory means, (B) equipment configurations discrete to the particular system, and (C) service features of the particular system, and control means for reading information from said first and second memory means and for reading information from and writing information into said third memory means and for executing instructions contained in said program information, said control means including apparatus responsive to information derived from said second memory means during the execution of said program instructions for obtaining information from said third memory means and for controlling said telephone switching system.

2. A program controlled telephone switching system comprising:

memory means containing sequences of program order words and data;

a control arrangement for reading information from said memory means, for writing information into said memory means, for executing said sequences of program order words, and for generating command signals; and an input-output system;

said memory means comprising three discrete portions, each of said portions defined by a specific range of absolute memory addresses, none of said ranges lying within other of said ranges, the first portion of said memory conditioned to define sequences of program order words and certain fixed data, and the second portion of said memory conditioned to define data specifying (A) the functional assignment of word locations of said third portion of said memory, (B) equipment configurations of the input-output system, and (C) service features of the system.

3. A program controlled processing system comprising:

an input-output system responsive to command signals, memory means conditioned to define sequences of program order words and data, said memory means comprising three distinct, discrete and mutually exclusive portions, said first portion conditioned to define fixed sequences of program order words and fixed data, said second portion conditioned to define data specifying the equipment configurations of said input-output system and the functional assignment of the storage locations of said third portion, and said third portion comprising registers for storing information relative to data processing in progress; and a control means for reading information from said memory means, for writing information into said memory means and for executing said sequences of program order words, said control means being responsive to information derived from said first portion for controlling said second portion and responsive to information obtained from said second portion for controlling said third portion of said memory means and for controlling said input-output system.

4. A telephone switching system comprising:

a plurality of discrete telephone switching centers, each of said switching centers being of a given class and comprising:

a plurality of communication paths, a switching network for selectively interconnecting said paths in response to command signals; and memory means comprising three discrete and mutually exclusive portions, said first portion conditioned to define sequences of program order words and fixed data said second portion conditioned to define variable data, and said third portion conditioned to define pluralities of assigned memory locations for storing information relative to calls in progress in said switching center, said variable data in said second portion specifying said functional assignment of said storage locations of said third portion and specifying the network configuration of said switching center; and control means for reading information from said memory means, for writing information into said memory means and for executing said sequences of program order words, said control means being responsive to information obtained from said first and said second portions of said memory means for controlling said third portion of said memory means and for controlling said communication paths and said switching network.

5. A program controlled telephone switching system comprising:

a switching network, first memory means conditioned to define sequences of program order words, second memory means conditioned to define addresses of a network map of the busy-idle state of said network and of the head and end cells of various registers, third memory means comprising said network map and said various registers, and control means for reading information from said first and second memory means for reading from and writing into said third memory means, and for executing instructions of said sequences of program order words, said control means including means responsive to reading of said second memory means under control of said first memory means for accessing said network map and said registers of said third memory means.

References Cited

UNITED STATES PATENTS

| | | | |
|---|---|---|---|
| 3,303,477 | 2/1967 | Voigt | 340—172.5 |
| 3,292,151 | 12/1966 | Barnes et al. | 340—172.5 |
| 3,266,020 | 8/1966 | Cheney et al. | 340—172.5 |
| 3,218,611 | 11/1965 | Kilburn et al. | 340—172.5 |
| 3,111,648 | 11/1963 | Marsh et al. | 340—172.5 |

ROBERT C. BAILEY, *Primary Examiner.*

G. D. SHAW, *Assistant Examiner.*